United States Patent [19]

Asprey

[11] Patent Number: 5,299,306

[45] Date of Patent: Mar. 29, 1994

[54] APPARATUS FOR SIMULTANEOUSLY COUPLING COMPUTER VIDEO SIGNALS TO A LOCAL COLOR MONITOR AND A DISTANT MONOCHROME MONITOR

[75] Inventor: Robert R. Asprey, Harvest, Ala.

[73] Assignee: Cybex Corporation, Huntsville, Ala.

[21] Appl. No.: 597,544

[22] Filed: Oct. 12, 1990

Related U.S. Application Data

[63] Continuation-in-part of Ser. No. 488,710, Mar. 5, 1990, which is a continuation-in-part of Ser. No. 447,010, Dec. 5, 1989, Pat. No. 5,193,200, which is a continuation-in-part of Ser. No. 95,140, Sep. 11, 1987, Pat. No. 4,885,718.

[51] Int. Cl.$^5$ .................................................. G06F 13/38
[52] U.S. Cl. ...................................... 395/153; 375/36; 395/500; 364/DIG. 2; 364/927.2; 364/927.3; 364/927.92; 364/929
[58] Field of Search .................. 395/200, 500, 325; 340/716, 717, 720; 375/36

[56] References Cited

U.S. PATENT DOCUMENTS

| | | | |
|---|---|---|---|
| 3,657,478 | 4/1972 | Andrews, Jr. | 178/63 E |
| 3,691,295 | 9/1972 | Fisk | 370/27 |
| 4,148,069 | 4/1979 | Smiley et al. | 358/160 |
| 4,641,262 | 2/1987 | Bryan et al. | 340/745 |
| 4,907,146 | 3/1990 | Caporali | 364/132 |
| 4,965,559 | 10/1990 | Dye | 340/717 |
| 5,030,896 | 7/1991 | Porter et al. | 315/383 |
| 5,089,886 | 2/1992 | Grandmougin | 375/36 |

OTHER PUBLICATIONS

Carlson, A. Bruce, "Communications Systems," Third Edition, McGraw-Hill, 1986, pp. 302-307.

Primary Examiner—Parshotam S. Lall
Assistant Examiner—Richard Lee Ellis
Attorney, Agent, or Firm—Phillips & Beaumer

[57] ABSTRACT

Circuitry is disclosed herein for coupling VGA analog video signals Red, Green, and Blue from a computer to a first signal conditioning circuitry including signal splitting circuitry for providing two sets of the VGA signals. One set of these signals is provided to a color monitor located proximate the computer, and the other set is provided to a cable up to 300 feet in length and having a plurality of discrete conductors. The conductors are coupled at an opposite end of the cable to a second signal conditioning circuitry and to an analog monochrome monitor, the second signal conditioning circuitry including voltage reduction means for reducing the Red, Green, and Blue signals to a reduced, different voltage level for each signal. The reduced signals are then summed to form a monochrome video signal that is provided to the monochrome analog monitor, the color signals each displayed thereon as a different shade of gray in accordance with a reduction factor of each of the voltage reduction means.

8 Claims, 8 Drawing Sheets

APPARATUS FOR SIMULTANEOUSLY COUPLING COMPUTER VIDEO SIGNALS TO A LOCAL COLOR MONITOR AND A DISTANT MONOCHROME MONITOR

CROSS REFERENCE OF RELATED APPLICATION

This application is a continuation-in-part of application Ser. No. 07/488,710, filed Mar. 5, 1990, which is a continuation-in-part of application Ser. No. 07/447,010, filed Dec. 5, 1989, now U.S. Pat. No. 5,193,200, which is a continuation-in-part of application Ser. No. 07/095,140, filed Sep. 11, 1987, now U.S. Pat. No. 4,885,718.

FIELD OF THE INVENTION

This invention relates generally to the coupling of signals between a computer and a keyboard and display unit, or K.D.U., and particularly to a communications link which enables the K.D.U. to be located at extended distances from the computer. In this case, the terminal contains either a monochrome or a color monitor driven by either TTL, composite video, or discrete analog video signals. Additionally, circuitry is provided that will convert analog color video signals to an analog monochrome video signal having shades of gray representative of color information.

BACKGROUND OF THE INVENTION

It is a convenient practice to physically separate a digital computer from the keyboard and display unit by which the computer is monitored and controlled. Actually the K.D.U. consists of two units, a cathode ray-type display and a keyboard. The cathode ray display or, as it is usually called, a monitor, and keyboard may be in the form of a single housed unit or, as more commonly today with microcomputers, the monitor and keyboard are separate. The most popular microcomputer presently in use is the IBM-PC microcomputer, and there are many units made by other manufacturers which generally employ the same or a similar arrangement for interconnecting a keyboard and monitor to a computer.

As a matter of convenience, there are separate electrical jacks on these computers for mating plugs, one plug connecting to a monitor cable and the other to a keyboard cable. The opposite ends of these cables have plugs which directly plug into the microcomputer video and keyboard jacks. Normally these cables are on the order of four to six feet in length, enabling some, but limited, separation of a monitor-keyboard work station from a computer. This typically requires that the computer and work station be generally located together.

It is to be appreciated, however, that there are situations, in fact, many, where it is desirable to separate the computer and a workstation. This may be by virtue of space limitations or because of environmental considerations, the latter sometimes including an inhospitable environment for a computer. Additionally, situations occur wherein it may be desirable to locate a computer and a workstation having a color monitor in a control room situation and locate an inexpensive monochrome monitor, also connected to the computer, in a factory or manufacturing environment, or other inhospitable environment, a distance away from the computer. In this case, and using software for a color computer which uses color backgrounds for highlighting, and a different color of data on the highlighted backgrounds, problems arise when the signal for a color monitor is split and one of the color signals fed to the monochrome monitor. Particularly, in some PC-type computers having a Video Graphics Adapter (VGA) video output card which provides color or monochrome video signals in accordance with the type of monitor connected to it, and in the instance where a monochrome monitor is coupled thereto, the VGA driver card will translate the color data into monochrome signals and output these signals on the green video signal line to the monochrome monitor. This conversion of color signals to monochrome signals is accomplished, in accordance with IBM tm VGA standards, by selecting the highest intensity of the color signals as the intensity at which to output all the data to the monochrome monitor. For example, if any of the color data is of high intensity, the VGA card outputs all the data at high intensity to the monitor. Likewise, if none of the color data is of high intensity and some is at normal intensity, all the data will be output at normal intensity and the same for the low intensity signals. The problem here is that if color data and a color background of like intensity is displayed, such as a normal intensity green background having normal intensity red data thereon, the conversion process results in normal intensity white background with normal intensity white data thereon at the monochrome monitor, resulting in the data being indistinguishable from the background.

This particular problem has been in existence for at least four years, with solutions to overcome the problem being software oriented. These solutions utilize various symbols to denote colors in a color environment and do not represent color data in a manner that is pleasing to the eye or readily discernable as a contrast, such as the aforementioned colored background and differently colored letters.

In addition to the aforementioned problem relating to data being indistinguishable from a background, the problems relating to signal interaction between keyboard and video signals when these signals are applied to non-shielded conductors of an extended-in-length cable are attended to as disclosed herein and in patent application Ser. No. 07/488,710, filed Mar. 5, 1990.

It is, therefore, the object of this invention to provide simple, reliable circuitry that receives color data signals from a computer and converts the signals to monochrome signals for an analog monochrome monitor wherein color conversion to a monochrome signal results in a gray scale such that every color and shade thereof is represented by a discrete, unique shade of gray and to further provide circuitry that will accept color signals from a computer, split these signals, and provide color signals to a color monitor and provide monochrome signals wherein colors are represented by a gray scale to a monochrome monitor.

SUMMARY OF THE INVENTION

A communications link is constructed wherein a computer provides analog color signals, including discrete R, G, and B signals, to a first signal conditioning circuit incorporating a signal splitting circuit that provides two sets of analog color signals. One set of these analog color signals is provided to an analog color monitor, and the other set of analog color signals is applied to a second signal conditioning circuit. This second signal conditioning circuit includes circuitry wherein the R, G, and B signals are each reduced in amplitude to a unique voltage level and these unique levels summed. The summed signal is then provided to an analog monochrome monitor.

BRIEF DESCRIPTION OF THE DRAWINGS

FIG. 7 (B) is a drawing of a waveform of the sync signal as it appears at collector 548.

FIG. 7 (C) is a drawing of the sync signal as it appears after traversing cable 200.

FIG. 7 (D) is a drawing of the sync signal as it appears after being regenerated by transistor 560.

Detailed Description of the Drawings

Figure 1:
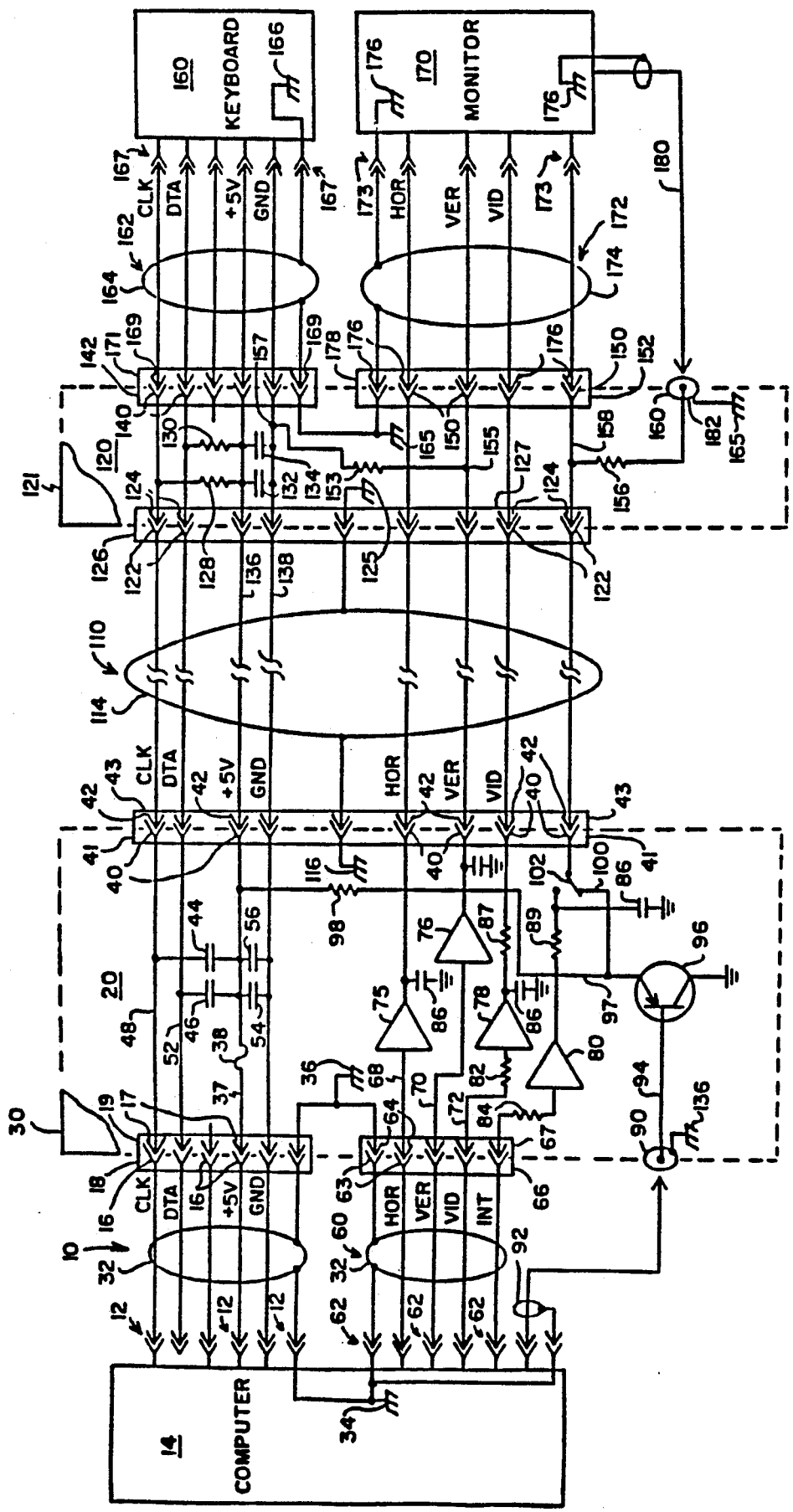
FIG. 1 is a schematic diagram of an embodiment of the invention where signal coupling is to a terminal combination employing a monochrome cathode ray display.

Referring to FIG. 1, a shielded cable 10 for a monochrome monitor is connected from keyboard input connector terminals 12 of computer 14 to receptacle terminals 16 housed in receptacle assembly 18. Receptacles 16 connect to plug terminals 17 of plug assembly 19 of signal conditioning circuit 20. Circuit 20 is located in housing 30 and, as labeled, connections to it are clock (CLK), data (DTA), +5 volts (+5V) and logic ground (GND). Cable shield or sheath 32 of metal is connected to both chassis ground 34 of computer 14 and chassis ground 36 of housing 30. A +5-volt input is coupled from connector terminals 12 from computer 14 via receptacle 16 and plug 17 to lead 37 through fuse 38 to receptacle 40 of receptacle assembly 41. Receptacle 40 is coupled to plug 42 of plug assembly 43, which in turn couples the +5 v. to shielded cable 110. The clock, data, and logic ground leads are similarly connected between like labeled connector terminals 12 to receptacles 16 and plugs 17, which are directly connected to receptacles 40 and plugs 42. Significantly, it has been discovered that interference between the video lines and clock and data lines is substantially reduced by employment of capacitors 44 and 46, capacitor 44 being connected from clock lead 48 to the +5-volt lead 37 and capacitor 46 connected from data lead 52 to +5-volt lead 37. Capacitor 44 has a value of approximately 0.002 mfd, and capacitor 46 has a value of up to approximately 0.006 mfd. IN addition, a relatively large capacitor 54, for example, 22 mf, is connected between +5-volt lead 37 and logic ground; and a smaller capacitor 56, for example, 0.1 mf, is also connected between these points. By this means, high frequency noise is shunted to ground via the smaller, faster-acting capacitor. The larger and slower-acting one is used to stabilize the +5-v. D.C. supply.

A second shielded cable 60 is connected from monitor output connector terminals 62 of computer 14 to functionally labeled receptacle terminals 63 mounted in receptacle assembly 66 and which connect to plug terminals 64 mounted in plug assembly 67 of signal conditioning circuit 20. As labeled, the monitor terminals are horizontal sync (HOR), vertical sync (VER), video (VID), and intensity (INT). Cable shield 32 is connected to chassis ground 34 of computer 14 and chassis ground 36 of circuit 20. Each of monitor leads 68, 70, 72, and 74 feed the input of a discrete TTL logic buffer amplifier (which switches high and low responsive to discrete high and low signal inputs) of amplifiers 75, 76, 78, and 80. The video input to amplifier 78 and intensity input to amplifier 80 are each fed through small, for example, 20 ohms, current limiting resistors, being resistor 82 and 84. These resistors effect a reduction in switching speed for the amplifiers to reduce output high frequency noise radiation. Each of the monitor signal leads, at the output of the amplifiers, is conventionally connected to ground through 22 pf (approximate) capacitors 86 as a means of reducing stray radiation, and there are small value, e.g., 33 ohms, resistors 87 and 89 in series with the outputs of amplifiers 78 and 80, respectively.

The outputs of amplifiers 75, 76, and 78 are connected to appropriately labeled signal outputs of receptacle terminals 40 of receptacle assembly 41.

A separate RCA-type jack 90 is mounted on housing 30 and is adapted to receive an RCA plug which feeds via a separate shielded cable 92 from a computer, e.g., computer 14, a composite video signal. A lead 94 from jack 90 is connected to the base input of a grounded collector transistor amplifier 96. It is powered through its emitter, being connected by lead 97 through resistor 98 to +5 volt lead 37 and a signal lead 100 connects the emitter to one terminal of selector switch 102. A second input to this switch is connected to the output of intensity amplifier 80. Thus, switch 102 provides on an output terminal of terminals 40, a video intensity signal, or an amplified composite video signal as desired.

A single, shielded, multi-conductor cable 110 has plug terminals 42 plugged into receptacles 40 of circuit 20. Its shield 114 is connected to chassis ground 116, and other leads are connected as labeled. Cable 110 thus includes all leads for both keyboard and monitor, and it may be made for extended range, for example, 50 to 150 feet or greater, terminating at a second signal conditioning circuit 120 where its receptacle terminals 122, mounted in receptacle assembly 126, mate with plug terminals 124, which are mounted in plug assembly 127.

Signal conditioning circuit 120 is mounted within housing 121, and like labeled leads of cable 110 are connected to like functions clock, data, +5-volt logic ground, vertical sync, horizontal sync, video, and intensity plug terminals 124. Shield 114 connects to chassis ground 125. Clock and data leads of the keyboard circuit are connected to +5 volts through resistors 128 and 130, each being closely approximate to 1,000 ohms. This serves to provide additional power to assist the keyboard (160) in raising the clock and/or data line voltage. Capacitor 132, for example, 22 mf, and a smaller capacitor 134, for example, 0.1 mf, are connected between +5 volts lead 136 and logic lead ground 138. The keyboard leads directly interconnect between plug terminals 124 of plug assembly 127 and like function receptacle terminals 140 mounted in receptacle assembly 142. The monitor related leads are directly connected between plug terminals 124 of plug assembly 127 and a discrete one of receptacle terminals 150 mounted in receptacle assembly 152, input and output leads functionality being maintained. A resistor 153, for example, 150 ohms, is connected between vertical sync terminal 155 and a logic ground terminal 157.

A small resistor 156, for example, 68 ohms, is connected between lead 158 and an output jack, for example, an RCA TM jack 160, the outer shield portion of which is connected to ground. This jack provides an output for composite video when switch 102 of circuit 20 is switched to a lower position.

Keyboard 160 is coupled to signal conditioning circuit 120 via a shielded cable 162 having an enclosing shield 164 connected between conditioning circuit ground 165 and keyboard ground 166. The leads of this cable from keyboard receptacle terminals 167 and, as functionally labeled, terminate in plug terminals 169 mounted in plug assembly 171. These leads are plugged into receptacles 140 of signal conditioning circuit 120. This thus completes a keyboard circuit between keyboard 160 and computer 14.

Monochrome monitor 170 is similarly connected to signal conditioning circuit 120 via a shielded cable 172 connecting from receptacle terminals 173 of monitor 170 to signal conditioning circuit 120. Shield 174 of cable 172 is connected to chassis ground 176 of monitor 170 and to chassis ground 165 of signal conditioning circuit 120. The function of each of the leads of cable 172 is labeled, and each lead connects to a plug terminal 176 mounted in a plug assembly 178 which plugs into a receptacle assembly 152 having receptacles 150 connected to signal conditioning circuit 120. In addition, signal lead shielded cable 180 provides an optional composite of video input to monitor 170, this cable being pluggable into receptacle 182. By the correction of monitor 170 to signal conditioning circuit 120, a circuit is completed between computer 14 and monitor 170.

By virtue of the combination of the two signal conditioning circuits described, shielded cable 110 enables a computer and terminal, or work station, to be widely separated. Tests thus far have shown that this distance can be up to 300 feet and probably may be longer. Interaction between monitor and keyboard circuits have been conditioned by the unique arrangement illustrated in a manner which provides adequate signal levels for communication and at the same time reduces interaction between circuitry elements to a point which enables error-free communications between a keyboard and computer and between a computer and monitor.

Figure 2:
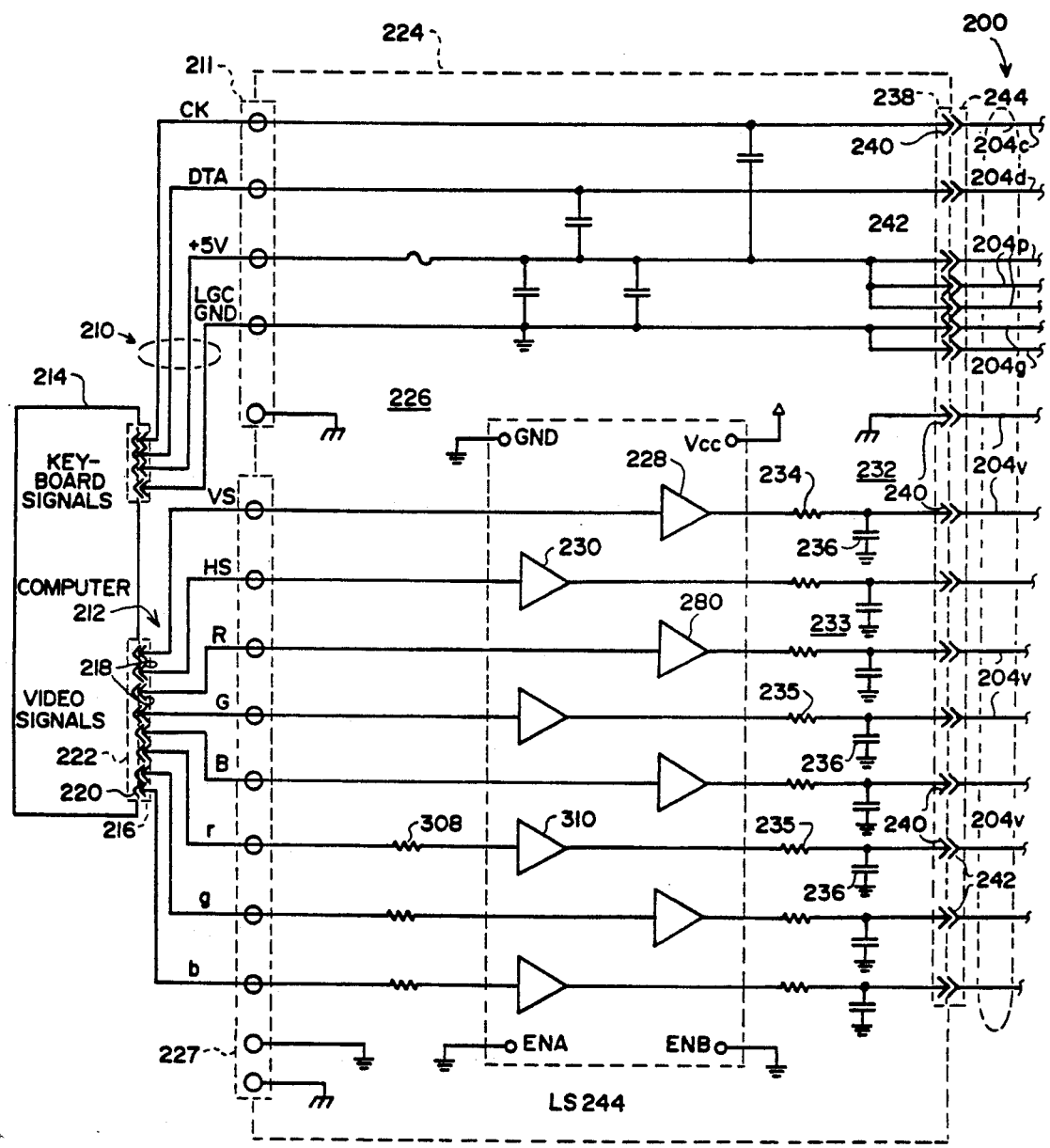
FIG. 2 is a portion of a schematic diagram of another embodiment thereof wherein coupling circuitry is disclosed for coupling a computer to a remotely located color or monochrome K.D.U.
Figure 3:
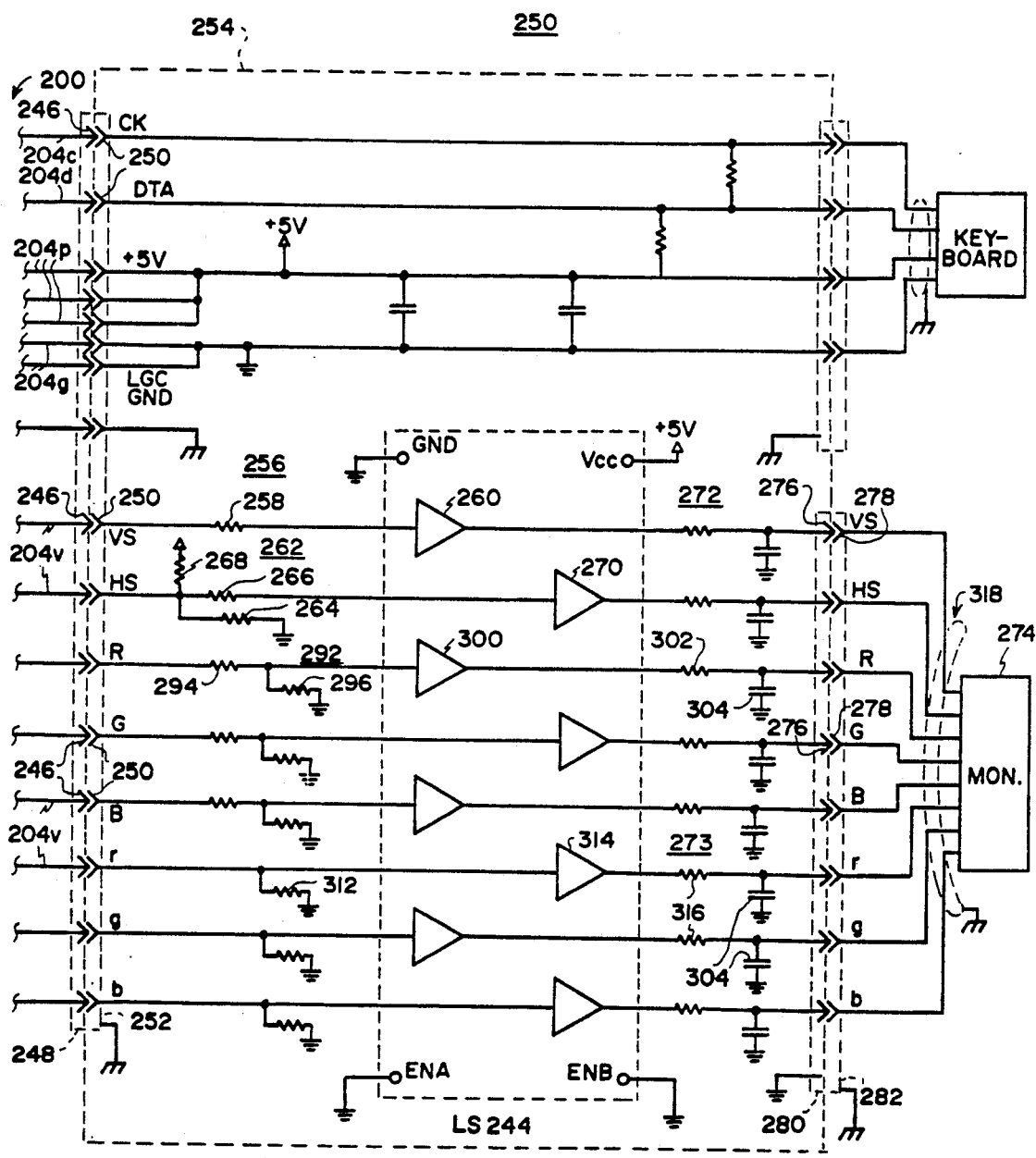
FIG. 3 is a continuation of that portion shown in FIG. 2.

In the instance where digital color monitors are being used in a K.D.U. (keyboard display unit), FIGS. 2 and 3 illustrate an extended range cable 200 and associated signal conditioning circuitry at each end thereof that is capable of extending the color K.D.U. a distance of up to 150 feet from the computer. It is to be noted that this particular circuitry is also capable of extended monochrome transmissions of up to distances of 300 feet.

It is to be further noted that in the instance where a monitor is to be used as a stand-alone component, such as in an inhospitable environment where it is desired only to provide a computer display, external +5-volt power would be provided to the signal conditioning circuitry via the keyboard power connection, with clock and data lines left unconnected.

Figure 5:
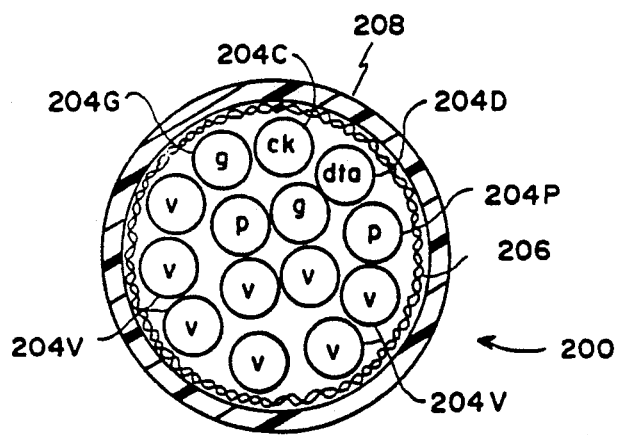
FIG. 5 is an illustration of a particular method for shielding keyboard clock and data signal lines from adjacent video signal lines in a cable.

When a keyboard is used, FIG. 5 illustrates a novel method for shielding keyboard clock and data signals from adjacent video carrying conductors. Cable 200 is a conventional cable constructed of multiple, insulated conductors 204 which maintain their relative position over the length of cable 200, and which is less expensive than conventional twisted pair cables used by most manufacturers, with cable 200 being shielded from electromagnetic interference by braided and foil shields 206 disposed around conductors 204. A flexible, insulative cover 208 in turn covers and protects shield 206 and conductors 204. Applicant has discovered that by applying keyboard clock and data signals to adjacent conductors 204c and 204d and then applying keyboard +5 volt power and ground potentials as shown to interposing conductors 204p and 204g, that the interposed conductors 204p and 204g effectively shields radiation from keyboard clock and data signals from color video information applied to conductors 204v.

With keyboard circuitry remaining as described above in a separate cable 210 from computer 214 (FIGS. 2 and 3), a shielded cable 212 (shield not shown for convenience) for carrying video signals is coupled from computer 214 by plug 216 having terminals 218 connected to terminals 220 of receptacle 222. Receptacle 222 (dashed lines) is supported by computer 214, with terminals 220 connecting to signal conditioning circuitry 226 housed in enclosure 224 via cable termination pad 227. Keyboard signals, when used, are routed to respective conditioning circuitry via termination pad 211. As described, receptacle 222 provides connections via terminals 218 and 220 for vertical sync signals (VS), horizontal sync signals (HS), and primary and secondary color video signals which include primary Red, Green, Blue, designated by R, G, and B, and secondary red, green, blue, designated r, g, and b, chassis ground and logic ground. These color video signals are used in at least two common color monitor systems, the color graphics adapter (CGA) system and enhanced graphics adapter (EGA) system. In the CGA system, the primary R, G, and B lines carry color video information, with the secondary g line carrying an intensity signal. Typically, in this system, the primary R, G, and B lines carry varying, independently discrete color signals, while the intensity signal on g fluctuates between high and low states and acts upon color guns turned "on" to vary their intensity simultaneously, making possible 16 different colors.

In the EGA system, on the other hand, and in addition to the primary R, G, and B signals, secondary r and b signals are provided in addition to the g signal, all of which may be varied independently from one another and additionally may be turned on independent from the primary r, G, and B signals, making possible 64 different colors.

Dealing first with sync signals, it is seen that the terminals 220 labelled VS and HS of cable 212 couple vertical and horizontal sync signals VS and HS to respective TTL buffer amplifiers 228 and 230. Amplifiers 228 and 230 accept varying quality signals from various types of monitors and serve to make these signals compatible with applicant's TTL transmission scheme. After being amplified, the sync signals VS and HS are passed through discrete RC networks 232 consisting of a series resistor 234 having a value of approximately 68 ohms and being coupled to a capacitor 236 connected to ground having a value of between 330 picofarads and 680 picofarads, with 470 picofarads being preferred. This capacitance range is maintained for all of RC networks 232 and 233, with the larger resistance of 68 ohms used because of the slower frequency of sync signals as opposed to faster video signals. The corresponding RC networks 233 which attenuate the faster video signals use a smaller resistor, 20 ohms. These RC network effects interference reduction by attenuating the high frequency components of the signal in order to reduce electromagnetic interference. Applicant has found that these high frequency components are not necessary to digitally transmit color or monochrome video signals over long cable runs, as will be described. Sync signals VS and HS are then output to a receptacle 238 housing terminals 240 coupled to terminals 242 in plug receptacle 244 and being connected to conductors 204v of cable 200. Cable 200, as stated, may be as long as 150 feet for a color K.D.U. or up to 300 feet for a monochrome unit.

At the K.D.U. end 251 of cable 200 (FIG. 3), the sync signals VS and HS are coupled via terminals 246 of plug 248 through receptacle terminals 250, with receptacle 242 supported by a second enclosure 254 (dotted lines) to a second signal conditioning circuit 256 housed in enclosure 254. The VS signal, being approximately 60 Hertz, is simply passed through a 1K ohm series resistor 258 which limits current to the following buffer amplifier 260. The HS signal, having a frequency in the low to mid KHz range, typically between 10–30 KHz for most digital monitors, is passed through a termination network 262 consisting of a 1K ohm parallel-to-ground resistor 264 and a series coupled 510 ohm resistor 266. In some instances where certain types of K.D.U.s are used with long cable lengths, it is necessary to include a 1K pull-up resistor 268 coupled to +5 volts to stabilize the pulses and present time shift of sync pulses caused by crosstalk superimposed thereon.

After signals VS and HS are passed by the 1K resistor 258 and through termination network 262, they are input to TTL buffer amplifiers 260 and 270. These amplifiers are Schmitt triggered with a 400 ms hysteresis deadband, an example of which being the 74LS 244 integrated circuit, and which serve to amplify the sync signals and produce clean, fast VS and HS transitions from the attenuated VS and HS signals. This process brings signal levels up to TTL compatible levels of the monitor and eliminates noise accumulated over the long cable run. After being amplified, the signals are again attenuated by being passed through RC networks 272. As before, these networks serve as roll-off filters to limit EMI radiation by eliminating high frequency components of the signal prior to being input to color monitor 274 via terminals 276 and 278 of receptacle 280 and plus 282, respectively. As with receptacle 252, receptacle 280 is supported by enclosure 254.

Figure 4:
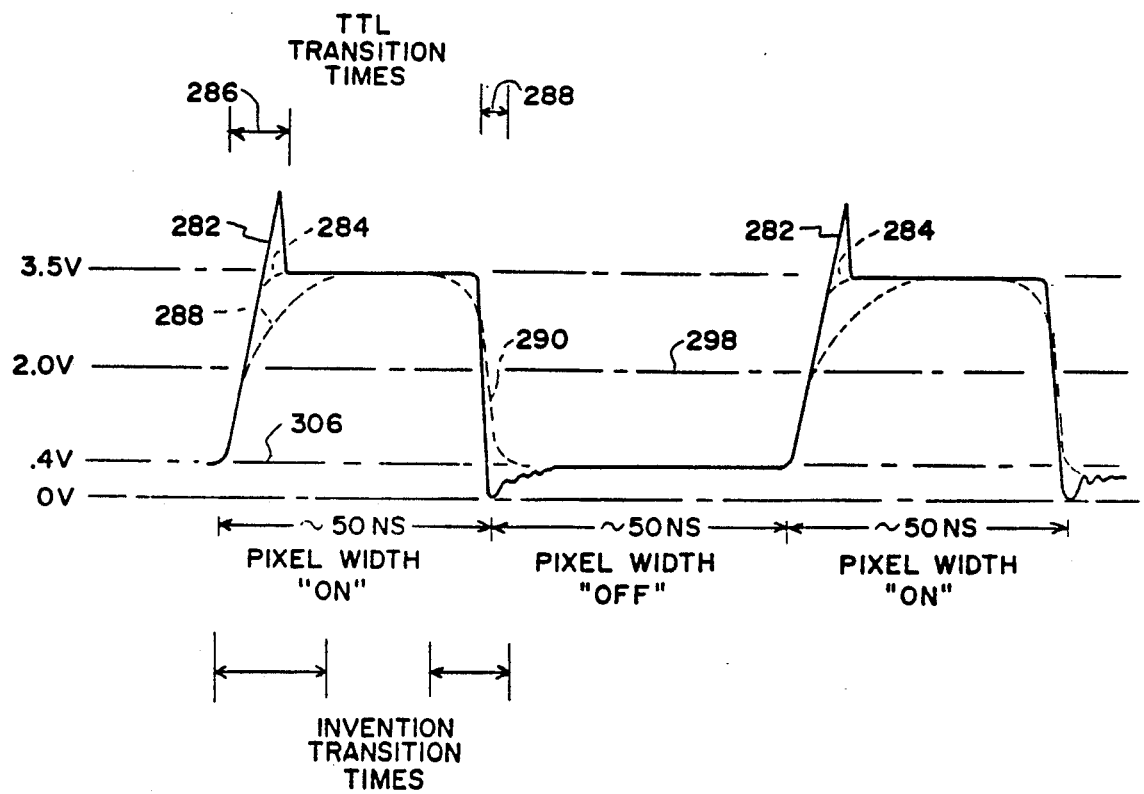
FIG. 4 is a waveform of pixel width or frequency, showing typical TTL video signals contrasted with applicant's signals.

Treatment of the primary R, G, and B signals will be undertaken next. These three signals control red, green, and blue color guns of the monitor and are treated in like manner en route from computer to K.D.U. Examining the primary red signal route, it being representative of the green and blue signal routes, it is seen that it is simply input via terminals 218 and 220 to computer video output cable 212, and designated R, to a TTL buffer amplifier 280 in an open ended configuration, meaning that only one wire is needed to transmit the red video information from amplifier 280. This is contrasted with the prior art which generally utilizes differential line drivers which require two wires per signal. Significantly, and referring to FIG. 4, since TTL signals are prone to cause induced noise in adjacent conductors due to their fast rise and fall times, typically in the low nanosecond range between 5–15 nanoseconds, applicant has found that by increasing capacitance of the standard RC networks 232 and 233 following buffer amplifier 280 by a factor of approximately 10, to 470 pf, they can attenuate that portion of the transmitted video signal which is greater than the dot-clock frequency (or pixel rate) of the monitor. This frequency varies between different manufacturers of monitors and is generally in the 10–30 MHz range. FIG. 4 illustrates the worse case frequency for an 18 MHz monitor having a pixel frequency of approximately 50 nanoseconds, this situation being when such a signal is transmitted by computer 214 to trigger "on" every other pixel in the monitor display. As shown, the normally sharp rising and falling edges of the standard TTL signal normally used for color monitors, and which is responsible for the greatest portion of interfering radiation, contains an overshoot region 282 inherent in most TTL switching devices. This is clipped by attenuation networks of the prior art to form a signal shown by dashed lines 284. However, this still results in a signal having a fast TTL rise time 286 and an even shorter fall time 288 which, while being desirable in digital circuitry, radiates EMI at frequencies determined by the rise and fall time. Of course, with an RC network having a fixed capacitance, the higher the pixel frequency, the more attenuation is achieved. In applicant's circuitry, the capacitance thereof is selected to provide minimal attenuation at 10 MHz, 50 percent attenuation at 20 MHz, and 70 percent attenuation at 30 MHz. Thus, applicant's video signals are provided with slow rise and fall times 288 and 290, respectively (dotted lines), which have been shown to drastically reduce high frequency components of radiated EMI. In other words, the rise time of the signal from buffer 280 is spread out by network 233 over a time period far longer than what is considered acceptable for use with TTL logic components. Because of this, some phase shifting occurs due to the highly attenuated signal, but because the signal ultimately is displayed on a monitor and the shifts are in the nanosecond range, they are undetectable to the eye. This technique, in addition to reducing EMI by eliminating high frequency components of the signals, allows applicant to transmit color digital intelligence over long, adjacent conductors without significant interference, or crosstalk, therebetween.

After being amplified and attenuated as described by amplifier 280 and RC network 233 (FIG. 3), the primary Red signal (R) is coupled as described to a single conductor 204v of 150-foot cable 200 and coupled as described to signal conditioning circuitry 256. Here, the primary Red signal first passes through a termination network 292 consisting of a series connected 33 ohm resistor 294 and a parallel-to-ground 150 ohm resistor 296. This network serves to limit overshoot of the signal and provides some current drain to eliminate any crosstalk that occurs over the 150 feet of conductor 204v. At this point, the discrete digital signals have a peak potential of between 3.0 and 3.5 volts, well above the 2.0-volt threshold 298 (FIG. 4) necessary to trigger "on" the following amplifier 300, which is also a Schmitt triggered buffer amplifier having a 400 millivolt hysteresis deadband (74LS 244).

Upon examining FIG. 4 at this point, it will become apparent that as applicant's video signal, substantially shown in dotted lines, and as received by signal conditioning circuitry 256, will have been phase shifted only a small amount in comparison to the total pixel width of approximately 50 nanoseconds, probably less than 10 nanoseconds from the standard TTL signal at the point where it crosses threshold 298, triggering "on" amplifier 300. At this point, the attenuated signal shown in dotted lines will reproduce a phase shifted TTl signal as shown which is shifted by 10 nanoseconds or less. To reduce EMI radiation of this reconstructed signal, applicant degrades the high frequency portion thereof. Buffer 300 amplifies the signal to a voltage level of approximately 3.5 volts, cleaning up the signal and buffering monitor termination network 274. After being amplified, the signal is fed to one of RC networks 272 consisting of a series connected 33 ohm resistor 302 and a coupled-to-ground connected capacitor 304. The capacitance of capacitor 304 is selected to be between 47 and 560 picofarads, with 470 picofarads being typical. The lower range of capacitance with respect to attenuation networks 232 and 233 is due to the shorter cable 318 coupled to monitor 274. This network again reduces the EMI radiation by clipping the high frequency components of the signal as described. The phase shift 306 (FIG. 4) caused by attenuation network 304 (FIG. 2) is cummulative with the same phase shift from attenuation networks 232 and 233 (FIG. 3). However, as descried, phase shift errors induced thereby on discrete pixels may be ignored because they cannot be detected by the eye when displayed on a monitor.

Treatment of the secondary r, g, and b video signals will now be undertake. Inasmuch as they are treated the same with respect to each other, slight differences exist between treatment in general between primary and secondary color video signals. Examining first the secondary red (r) video signal, it being representative of the green and blue secondary signal routes, it is input to signal conditioning network 226 from the computer at terminal 218, designated r, of receptacle 222. Thereafter, the secondary red signal, being a weaker signal than the primary R signal, is passed through a 100-ohm resistor 308 which serves to attenuate the square wave signal to avoid high frequency induced crosstalk. Next, the secondary red signal is input to a TTL buffer amplifier 310 coupled in open ended configuration for reasons described, which amplifies the signal prior to passing it to one of RC networks 232. Network 232 is a like network to that described for the primary Red signal and used for the same purpose i.e., EMI reduction and signal attenuation. The signal then passes to terminals 240 and 242 of plug 238 and receptacle 244 and thereafter to the 150-foot conductor 204$v$ in cable 200. After passing through terminals 246 and 250 of plug 248 and receptacle 252 at the K.D.U. end (FIG. 3), the secondary red signal is terminated by 100 ohm termination resistor 312, which eliminates induced crosstalk superimposed on the signal by providing a slight current drain. The signal is then input to the integrated circuit containing another Schmitt trigger buffer amplifier (74LS 244) 314 which again buffers the termination networks of monitor 274. After being amplified, the secondary red signal is passed through one of RC networks 273 utilizing a 20 ohm resistor 316, with network 273 used as described for the primary red signal for the same purpose, i.e., EMI reduction and clipping of the high frequency component of the secondary rgb signals. It should be noted, however, that selection of 470 picofarad capacitance for capacitors 314 is not as critical as is the selection of capacitance of capacitor 236 of networks 233 due to the shorter cable length of cable 318 from monitor 274 connecting plug 282 to receptacle 280. As stated, these capacitors may have values that range from 47 to 560 picofarads.

Figure 6:
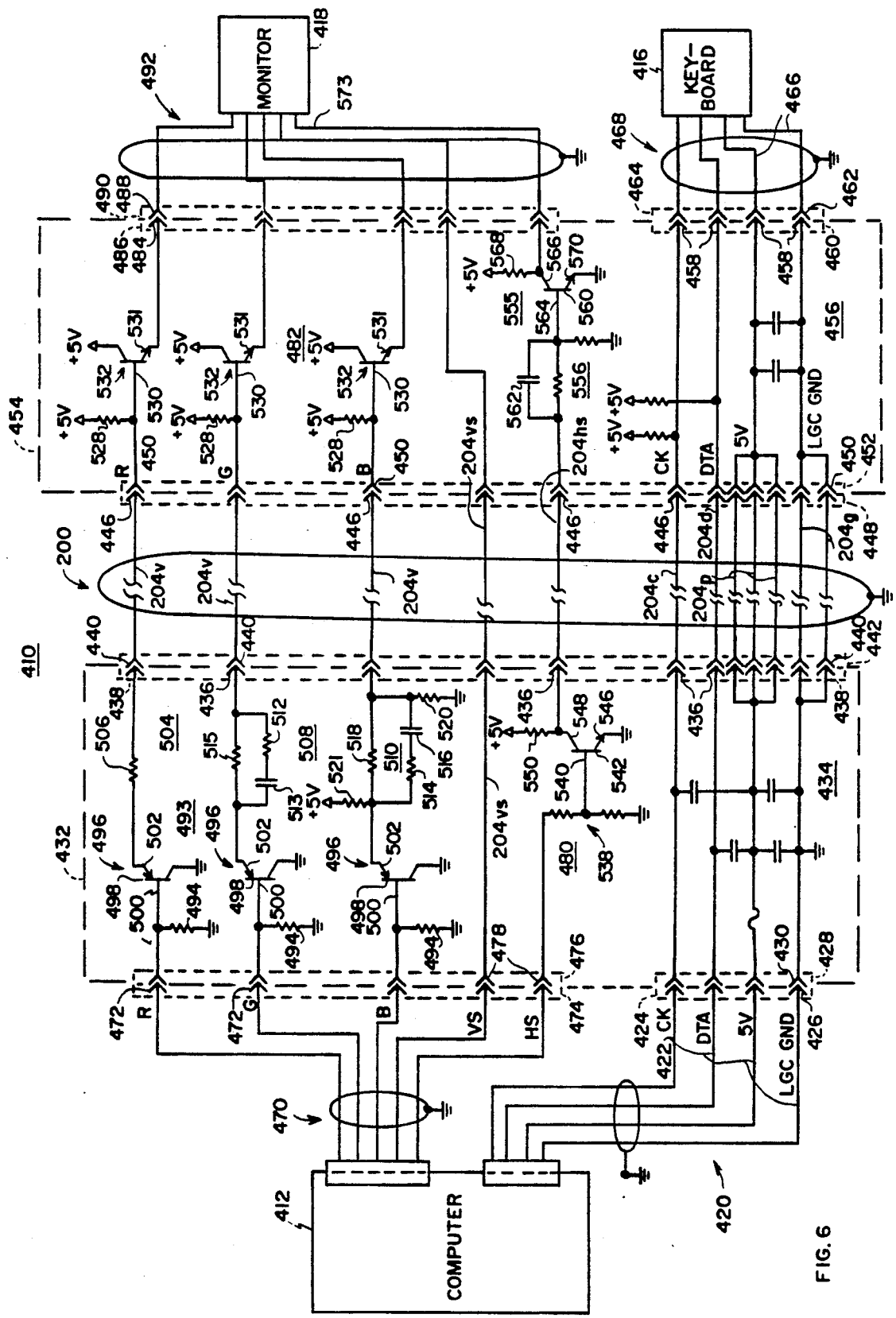
FIG. 6 is a view of yet another embodiment of this invention wherein circuitry is disclosed for conditioning analog R, G, and B and HS signals for transmission in a cable up to 300 feet in length.
Figure 7:
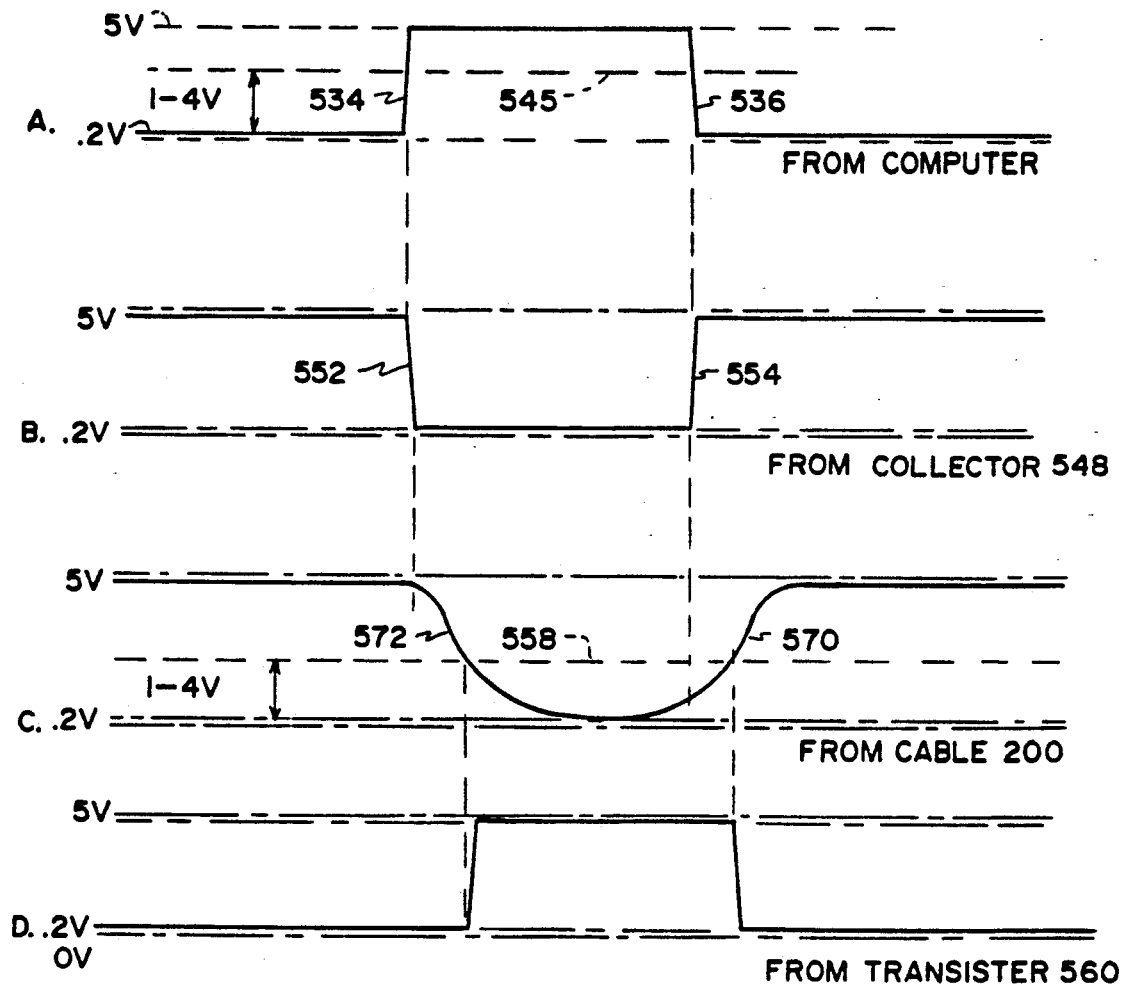
FIG. 7 (a) is a drawing of a waveform of a sync signal from a computer.

In the instance where color analog video signals and sync signals are to be provided from a computer to a color analog monitor and keyboard, FIGS. 6 and 7 illustrate an extended range cable system 410 for coupling a computer 412 any distance specified by the customer up to 300 feet via a single extension cable 200 from a keyboard 416 and analog monitor 418. As in the prior embodiments described herein, a computer keyboard cable 420 is constructed of insulated conductors 422 which convey keyboard clock, data, +5 volts, and logic ground signals from computer 412 and which terminates after a short distance with a plug 424 having terminals 426, one for each keyboard conductor. Plug 424 is inserted into a receptacle 428 having a like quantity of electrically mating terminals 430 and which is supported by an enclosure 432 (dashed lines). Enclosure 432 houses keyboard signal conditioning circuitry 434, which conditions the keyboard signals as described above and passes them via terminals 436 and keyboard output receptacle 438 to terminals 440 of plug 442 supported by extender cable 200, which terminals are coupled to conductors 204 of cable 200. Cable 200 is made up of a plurality of adjacent, insulated conductors 204 which are not twisted pairs or discretely shielded and which is much cheaper than the extended cables of the prior art utilizing differentially driven twisted pairs or discretely shielded conductors in a bulkier, more expensive cable. After passing through cable 200, the keyboard signals pass through terminals 446 of another cable plug 448 to terminals 450 of receptacle 452 supported by a second enclosure 454, which houses another keyboard signal conditioning network 456 that also functions as described above. After being conditioned the second time, the keyboard signals are passed via terminals 458 of receptacle 460 to terminals 462 of plug 464, in turn coupled to conductors 466 of keyboard cable 468, connected to keyboard 416. Keyboard clock and data conductors 204$c$ and 204$d$ are isolated from video conductors 204$v$ by power and ground conductors 204$p$ and 204$g$ as described above and shown in FIG. 5.

In a like manner, analog video signals are provided along separate, insulated conductors 204$v$, 204$vs$, and 204$hs$ of computer cable 470 terminals 472 of plug 474, which connects to receptacle 476 having mating terminals 478 and is supported by enclosure 432. Enclosure 432 also houses video signal conditioning circuitry 480, which conditions analog signals red (R), green (G), and blue (B) and horizontal sync (HS) signals and outputs these conditioned signals via terminals 436 of receptacle 438 to terminals 440 of plug 442 supported by extended range cable 200. Vertical sync signals are not conditioned in this embodiment. Terminals 440 of plug 442 are connected to conductors 204$v$, 204$hs$, and 204$vs$ of cable 200. As with the keyboard conductors 204$c$ and 204$d$, the video conductors 204$v$ of cable 200 terminate with terminals 446 of plug 448 which electrically mate to terminals 450 of receptacle 452 supported by the second enclosure 454 housing the second video conditioning circuitry 482. Generally, this second video conditioning circuitry 482 reconstructs the video signals passed over the extended range cable 200, which become degraded and attenuated thereby and which also contain noise due to crosstalk induced by adjacent conductors. After being conditioned and reconstructed, the video signals are passed via terminals 484 of receptacle 486 to terminals 488 of plug 490 supported by cable 492, in turn connected to monitor 418.

As stated, the analog video signals provided by computer 412 consist of discrete red (R), green (G), and blue (B) signals which generally vary between 0–700 mv and act upon the red, green, and blue electron guns of the monitor CRT to vary beam currents thereof relative to signal amplitude. A horizontal sync pulse (HS) provides horizontal synchronization to the monitor and consists of a pulse of approximately 40–100 microseconds at a frequency of approximately 10–25 KHz. This HS pulse is either positive-going or negative-going, depending upon the mode in which the monitor is used. A vertical sync pulse (VS) provides vertical synchronization to the monitor and consists of a pulse of approximately 400 microseconds at a frequency of approximately 50–70 Hz. The exact specifications of these signals vary from manufacturer to manufacturer, with examples thereof herein being merely for convenience of illustration.

Examining first the signal conditioning circuitry 493 for the R video signal, it is seen that initially the R signal is passed across resistor 494, being in the range of 75–85 ohms, with 82 ohms being preferred, coupled between the signal line and ground. An identical resistor 494 coupled as shown and described for the R video signal is also employed for the G and B video signal lines. Resistor 494 serves as a termination resistor for the video output card (not shown) of computer 412 and is, in most cases, selected to be of approximately 10 percent higher resistance that the standard 75-ohm load normally used to terminate video signals. This reduces loading on the video output card of computer 412 which, in addition to reducing current flow it must provide, results in a signal having a slightly higher amplitude than standard video signals. This higher-in-amplitude signal, when applied to the following amplifier stage 496, which has slightly less than unity gain, helps offset line losses in extended cable 200. Amplifier stage 496 may be a PNP transistor 498, which is coupled in emitter-follower configuration and functions as a current gain amplifier. As with resistor 494, an identical transistor 498 is utilized in a like manner for the G and B signal lines, with like numerals designating like components. The amplitude of the video signal applied to base 500 of transistors 498 is maintained at emitters 502 (in addition to the 0.7 volt silicon drop) of transistors 498, while current flow of the signal is increased by approximately 50 times. Thus, transistors 498 modulate signal current flow through conductors 204v responsive to the R, G, and B video signals applied to bases 500 and provides the power necessary to pass the video signals over the up to 300-foot conductor 204v of extended cable 200. Next, and examining the signal path for the R video signal, it is passed through an impedance matching network 504 consisting, in one embodiment, of a 45–70 ohm resistor 506, with a 51-ohm precision resistor being preferred. It has been discovered that the characteristic impedance of conductors of the cable described herein for extended range use is between 50 and 60 ohms and that a 51-ohm series resistor 506 provides close-to-critical signal damping such that virtually no overshoot or ringing of the signal occurs. While this resistor works well enough in most cases to provide critical damping of the signal, other schemes to achieve critical damping may be desirable with some combination of computers and terminals/extender cable lengths and include an impedance matching network 508, as shown for the G signal, and yet another network 510 as shown for the B signal. Network 508 (G signal) consists of a resistor 512 of approximately 100 ohms in series with a very small capacitor 513 of approximately 100 pf, these components being in parallel with resistor 515 (approximately 100 ohms) as shown. The value of capacitor 513 is selected according to the length of extender cable 200, and for shorter cable lengths of less than approximately 50 feet, it may be left out entirely. Its maximum value, for a 300-foot cable, is approximately 100 pf, with lower value capacitors used for shorter cable lengths. This network provides slightly better damping characteristics for higher frequencies than resistor 506 by itself.

Network 510 (B signal) consists of a 100-ohm resistor 514 in series with a 470 pf capacitor 516, with these components being in parallel with a 100-ohm resistor 518 in series with the signal line. A 510-ohm resistor 520 is coupled between the signal line and ground, and a 150-ohm pull-up resistor 521 to ensure fast signal response is coupled between emitter 502 of transistor 496 and +5 volts. In this embodiment utilizing network 510, a minimum of current is always flowing through conductor 204v via resistor 520, while modulated current is drawn through the conductor by the varying B video signal applied to base 500 pf transistor 498. This results in a cleaner, more powerful signal with less noise received at signal conditioning circuitry at the monitor end of cable 200.

All of these impedance matching networks provide 45–70 ohms, with 51 ohms appearing to be optimum, to cable 200 in order to tune the signal to the characteristic impedance of the conductors 204v of cable 200. Additionally, like impedance matching networks would be used for the R, G, and B signals in any particular extension system.

After being conditioned as described, video signals R, G, and B are coupled as described by extender cable 200 to the second video conditioning network 482 located proximate keyboard 416 and monitor 418. Here, a pull-up resistor 528 between 240–500 ohms, with 360 ohms being preferred, coupled to +5 volts powers the video signal to transistors 498 via conductor 204v of cable 200 and reconstructs the faster rise times which have been degraded by being attenuated by conductor 204v of cable 200. The video signals are applied to base 530 of NPN transistor 532, as shown for the R signal, which is also connected in emitter-follower configuration to again boost power of the signal prior to inputting it to analog monitor 418 via emitter 531.

The current gain amplifier stages described above for the video signals may be discrete transistors, as described, or they may be one of any of the commercially available wideband amplifiers packaged in integrated circuit form with attendant ancillary components. Additionally, the impedance matching networks described may utilize transformers to accomplish impedance matching of the video signals to conductor 204v of cable 200. In any case, it is important to note that the discrete signals are applied to discrete conductors of cable 200.

Next, the horizontal sync signal will be examined. As shown in FIG. 7a, the HS signal as output by computer 412 shown as a positive-going pulse of approximately 10 microseconds at a frequency of 10-30 KHz and has an amplitude of 3.5-5.0 volts, depending upon the manufacturer of the system. As stated, a negative-going HS pulse may also be used with the circuitry described herein. Rising and falling edges 534 and 536 of the horizontal pulse are generally very fast, being generally in the range of 150 nanoseconds, which normally would cause significant radiated noise and crosstalk in the adjacent, non-twisted pair, unshielded conductors 204v of cable 200. Applicant has overcome these problems, in addition to the shielding technique described above, by converting the HS signal to a voltage signal and allowing the conductor conveying the HS pulse to attenuate the high frequency components of the signal to a point where radiated noise and crosstalk is greatly reduced or eliminated entirely. This attenuated voltage signal is reconstructed to its original form prior to being input to the monitor.

Initially, this HS signal is applied to a voltage divider network 538 of signal conditioning network 480, after which it is passed to base 540 of a switching and inverting amplifier consisting of transistor 542, which is biased normally off. Voltage divider network 538 establishes a voltage threshold 545 (waveform 7a) of between 1-4 volts, with 2.8 being preferred, that the incoming HS pulse must rise to before providing the necessary proportional 700 mv to base 540 of transistor 542 in order to switch "on" transistor 542 to a conductive state. This threshold is adjusted to provide a threshold higher than any anticipated noise on the signal line from computer 412 to prevent any false triggering of transistor 542. As shown, transistor 542 is connected with its emitter 546 coupled to ground, and its collector 548 coupled via a 200 ohm pull-up resistor 550 to +5 volts. Collector 548 also provides the switched and inverted output to extension cable 200. Connected as shown, transistor 542 is biased "off" with less than 700 mv (corresponding to less than 2.8 volts applied to voltage divider network 538) applied to base 540, providing +5 volts at the output of collector 548. When the voltage input to network 538 rises above the 2.8 volt threshold 544 (FIG. 7a), voltage applied to base 540 of transistor 542 rises above 700 mv, switching transistor 542 "on," drawing current from resistor 550 through collector 548 and emitter 546 ground. This draws the voltage at collector 548 to near zero volts, as shown by waveform 7b. When the trailing edge 536 of the HS pulse 7a passes downward through the 2.8 volt threshold 545, transistor 542 is switched "off," and collector voltage rises again to +5 volts. Thusly, the HS pulse is inverted prior to being input to cable 200. Additionally, the potentials of the HS pulse are applied to extender cable 200, allowing current flow through the cable to be kept to a minimum. This allows the capacitance of the cable to attenuate the falling and rising edges 552 and 554 of the HS pulse as shown in waveform 7c, reducing the attendant noise problem associated with fast rise times (RF crosstalk) transmitted over a relatively long cable with adjacent conductors.

Signal conditioning circuit 555 at the opposite end of cable 200 receives the attenuated HS signal 7c where it is applied first to a filtering and voltage dividing network 556. Voltage divider network 556 establishes a 1-4 volt threshold 558 (FIG. 7c), with 3.3 volts being preferred, the inverted HS pulse 7c must pass through before switching the following transistor 560. The generally higher 3.3-volt threshold suppresses a higher level of noise acquired by conductor 204hs of cable 200 than the 2.8-volt threshold 545. Capacitor 562, being generally in the range of 2,200 pf, allows the remaining high frequency components of the signal to be passed to base 564 of transistor 560 while blocking the slower D.C. components thereof. Transistor 560 functions as a switch and is biased normally "on" by base 564 being held above 700 mv by the +5 volt portion of waveform 7c representative of the "off" portion of the HS pulse from computer 412. Collector 566 is coupled via 100-ohm resistor 568 to +5 volts, and emitter 570 is coupled to ground. Coupled as described, an inverted, falling edge 572 of HS pulse 7c passing through the 3.3 volt threshold 558 reduces the proportional applied voltage to base 564 below 700 mv, switching transistor 560 "off," which in turn allows the collector voltage to rise to +5 volts for the duration the inverted HS pulse 7c is below the 3.3-volt threshold 558. Of course, when the rising edge 570 of inverted HS pulse 7c passes upward through the 3.3-volt threshold, transistor 560 is switched "on," shunting current through resistor 568 to ground and dropping the voltage at collector 566 near 0 volts. In this manner, the inverted HS pulse is reconstructed and fed to the HS input 573 of monitor 418.

The switching transistors described above for the HS pulse may be replaced with Schmitt triggered amplifiers, or comparators may be used equally well for the described purpose.

The vertical sync pulse (VS) is merely fed straight through the first signal conditioning network via conductor 204vs and coupled to conductor 204v of extender cable 200 to the second signal conditioning network where it is again fed therethrough via conductor 204vs to monitor 418. Thus, no signal conditioning is undertaken with the VS pulse. This is because it is a slower signal and does not create significant crosstalk when applied to conductor 204 vs of cable 200 with adjacent conductors.

Figure 8:
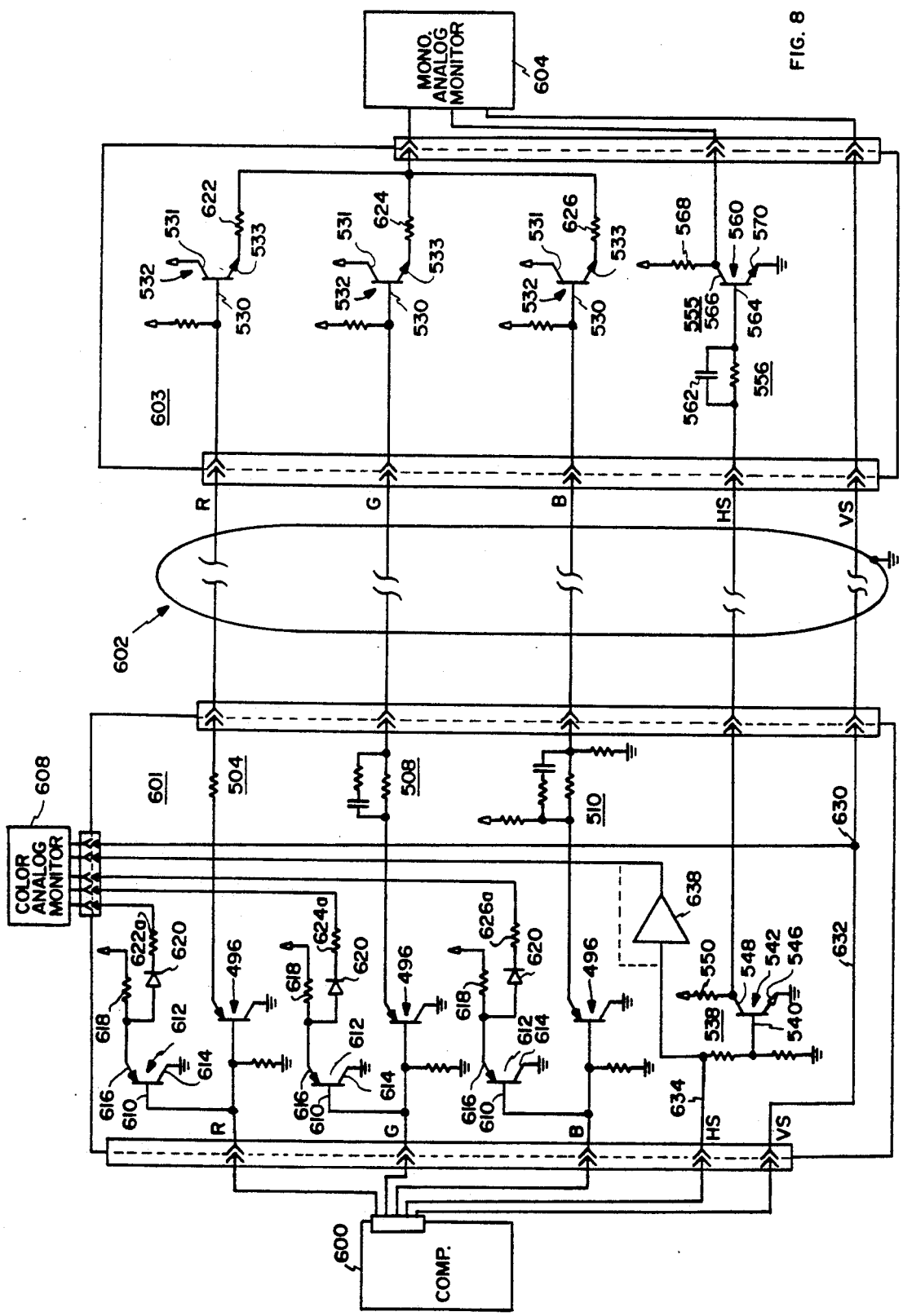
FIG. 8 is a schematic diagram illustrating an embodiment of this invention which provides color analog signals from a computer to a color analog monitor located proximate the computer, and monochrome signals to a distantly located monochrome monitor wherein the color information is represented as shades of gray.

A modification to this embodiment is shown in FIG. 8. Here, in the preferred embodiment, the color analog signal from the VGA section of computer 600 is slit in signal conditioning circuitry 601, and one set of the color signals fed via an extended cable 602 as described above to signal conditioning circuitry 603 in turn coupled to a monochrome monitor 604 remotely located from computer 600, where it is desired to monitor operation of computer 600. The other set of color signals is fed to a color monitor 608 generally located proximate computer 600. However, the circuitry of FIG. 8 may be configured such that either of the monitors may be color or monochrome, as will be explained.

Slitting of the analog color video signals to obtain two discrete sets of R, G, and B signals is accomplished, to obtain a set of signals for monitor 608, by applying the discrete signals from computer 600 to bases 610 of PNP transistors 612, which bases being coupled in parallel with the PNP transistors 496 of the last embodiment described above, and which is illustrated in FIG. 6. Transistors 612 are connected in emitter-follower configuration, with collectors 614 coupled to ground. Emitters 616 are connected to power, typically +5V, through resistor 618, which limits current flow through transistors 612. The video signals R, G, and B of this set are taken from emitters 616 as a voltage signal and passed through diodes 620 oriented to provide a 600 ma voltage drop at emitters 616 of transistors 612, after which the R, G, and B signals are applied to local monitor 608 located near computer 600. The other set of signals is taken from transistors 496 as described above and passed to signal attenuation networks 504, 508, or 510, the particular one of these networks used being determined by the length of cable 602, also as described above.

Sync signals, vertical and horizontal sync, from computer 600 are also split and applied to local monitor 608 and remote monitor 604. For the vertical sync signals, this is done by simply connecting a second signal line at point 630 between signal line 632 and local monitor 608. No conditioning is necessary because the sync signals are of a frequency of about 60 Hz, which provides ample time for the signals to recover from the induced inductance and capacitance of the conductor of cable 602. For the horizontal sync signals, however, and as described above, a voltage divider network 538 and switching and inverting transistor 542 are utilized to condition the horizontal sync signal prior to applying the signal to the conductor of cable 602. In order to obtain the second sync signal, a second signal line is coupled to the signal line from computer 600 prior to voltage divider network 538 and coupled as shown by dotted lines to the local monitor 608. In some instances, a buffer amplifier 638 is needed to boost the signal where the driver card in the computer is not strong enough to drive the two monitors and the long conductor of cable 602. This buffer amplifier may be Darlington configured transistors, a discrete integrated circuit buffer amplifier, or any two-transistor pair used to amplify and correctly polarize the signal.

At the remote monochrome monitor 605, at the opposite end of the extended cable 602, which may be up to approximately 300 feet in length, the color signals R, G, and B are fed as described above to bases 530 of NPN transistors 532, with collectors 531 thereof tied to DC power. However, the analog color output signals of approximately 700 mv as described above taken from emitters 531 of these transistors are each fed through series resistors 622, 624, and 626, each of which having a value unique to that particular signal, limiting current flow and dropping the voltage levels to a selected value less than 700 mv. After passing through resistors 622, 624, and 626, these outputs are added together in parallel, or summed, in order to combine the three color signals. This signal is then applied to monochrome monitor 604 as a combined signal resulting in the three colors being displayed as different shades of gray.

Values of resistors 622, 624, and 626, or weighing of the R, G, and B signals with respect to the shades of gray generated therefrom would seem to be optimum if the range of gray, or voltage drop from 700 ms, was selected to be equally spaced percentages, such as 700 mv being full bright, 465 mv (67%) being normal bright, 238 mv (34%) being dim, and of course, 0 mv being off. However, applicant has discovered through experimentation that this is not the case. In fact, values of these resistors are selected to be 27 Ohms for the blue signal (resistor 626), 20 Ohms for the red signal (resistor 622), and 7.5 Ohms for the green signal (resistor 624). These values drop the voltages of the signals to about 637 mv (91%) for the blue signal, about 546 mv (78%) for the red signal, and about 511 mv (73%) for the green signal, generating a unique, readily discernable shade of gray for each color. When these signals are combined as described and fed to a monochrome monitor, an optimum contrast between shades of gray representative of the three colors is obtained, enabling an observer to readily differentiate therebetween. Additionally, when colors are mixed to form different colors other than the primary video colors R, G, and B, different, unique shades of gray emerge for each mixed color. While applicant's selection of the above-cited values for resistance and voltage levels of the color signals appear to be optimum, other resistances and voltage levels may be used to generate unique shades of gray representative of each color.

Alternatively, voltage divider networks may be employed to obtain the color signal voltages as described above to produce a unique shade of gray for each color. In this instance, values of resistors making up the discrete voltage divider networks (not shown) would be selected to provide the voltages discussed above for each color. The networks would have one resistor of the networks coupled to ground and the other coupled to the signal line. The reduced voltage to produce a unique shade of gray would be taken from a point between the resistors. Additionally, an operational amplifier may be used for each color signal, with the outputs thereof adjusted to provide a different, unique voltage level for each color signal. Still further, transformers having windings disposed to receive the discrete color signals and provide unique, proportionally reduced signals which are then added and provided to a monitor may be used. Further yet, capacitors and/or inductors may be substituted for the resistors, both of which serve to reduce signal voltage of the discrete color signals to unique values prior to being added. Lastly, diffused optical coupling may be used wherein semi-translucent or semi-transparent elements are included between a light source and a light receiver in order to reduce discrete color signals to selected levels prior to adding.

Figure 9:
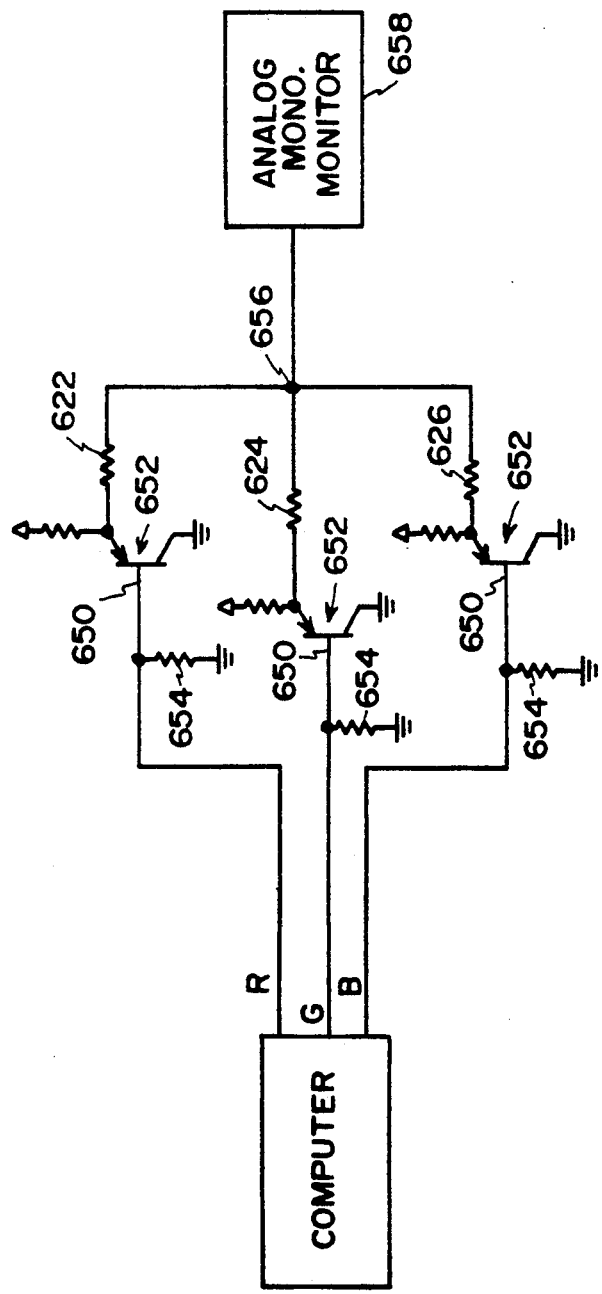
FIG. 9 is a schematic diagram of circuitry for eliciting color signals from a computer, and for converting the color signals to a gray scale.

Useful variations of this circuit include coupling an analog color monitor to signal conditioning circuitry 603. In this case, resistors 622, 624, and 626 would simply be left out, and the signal lines R, G, and B conventionally connected to the color monitor. Also, an analog monochrome monitor may be coupled to signal conditioning circuit 601 and the color signal converted to a gray scale as described above by locating resistors 622, 624, and 626 of signal conditioning circuit 603 in signal conditioning circuit 601, as shown by resistors 622a, 624a, and 626a. The signal from resistors 622a, 624a, and 626a would then be summed as described and input the analog monochrome monitor coupled to signal conditioning circuitry 601. Another variant of this circuit is shown in FIG. 9. Here, the R, G, and B analog outputs from the VGA section of the computer are applied from computer terminals, across a 75 Ohm load resistor 654, to relatively high impedance bases 650 of transistors 652. Resistors 622, 624, and 626 are coupled as shown in series with emitters of transistors 652, and perform the voltage reduction as described above, with the resulting reduced voltages being summed at summing junction 656. As described, summing junction 656 is coupled to the video input terminal of analog monochrome monitor 658, with the summed voltages producing a unique shade of gray at the monitor for each color. In this embodiment, the circuitry of FIG. 9 simulates the input of an analog color monitor by presenting a 75 Ohm load to each of the R, G, and B outputs, which in turn elicits the R, G, and B signals from the VGA section of the computer. Sync signals are applied from the computer sync terminals to the monitor using any of the applicable circuits as described above. This circuitry is useful when it is desired to connect an analog monochrome monitor to a computer using software written for a color monitor. Alternately, transistors 652 and resistor 654 may be replaced by any of the devices described above, E.G. voltage divider networks, operational amplifiers, transformers, capacitors and inductors or diffused coupling.

While certain electrical components have been states as having specific values, it is noted that these values may be changed by as much as 20% without significantly affecting the described circuitry.

It is also to be noted that in this embodiment, as with the others described herein, the signal conditioning networks shown in separate enclosures, or portions thereof, may be incorporated into the computer and monitor or keyboard, or a composite terminal (not shown) with the extending cable coupled between the computer and monitor or keyboard or terminal. Additionally, where a computer is provided with ports for connecting a monitor and keyboard thereto, the cables to the signal conditioning network for the computer are provided with plugs adapted to electrically interface therewith. As is also conventional, the enclosures housing the signal conditioning circuits are provided with appropriate connectors to interface with monitor 418, keyboard 416, or a composite terminal.

From the foregoing, it is apparent that the applicant has provided circuitry for remotely coupling a color K.D.U. a distance of up to 150 feet from the computer, the circuitry being inexpensive and easy to manufacture while providing reliability of operation. Additionally, in another embodiment of this invention, circuitry is described for coupling analog video signals to a monitor and keyboard located up to 300 feet from a computer. In yet another embodiment of the present invention, circuitry is disclosed for coupling a pair of analog monitors to a computer, one proximate thereto and the other remotely located from the computer.

After having described my invention and the manner of its use, it is apparent that incidental changes may be resorted to that fairly fall within the scope of the following appended claims, wherein I claim:

1. A communications link for coupling video output terminals of a computer conveying analog RED, GREEN, and BLUE video signals to an analog color monitor located generally proximate to a computer and to an analog monochrome monitor located up to approximately 300 feet distant from said computer, said communications link comprising:
 a first signal conditioning circuit couplable to RED, GREEN, and BLUE video signals at output terminals of said computer, and further comprising:
  a plurality of signal splitting means, each responsive to a respective one of said video signals, for providing two discrete sets of said video signals, a first set and a second set, said first set being couplable to an analog color monitor located proximate to said computer,
  a shielded, insulated cable up to approximately 300 feet in length having at least three discrete, insulated, closely adjacent conductors, each conductor having a first end and a second end for conveying current signals from said second set, representative of each respective said RED, GREEN, and BLUE video signals, from said first end to said second end,
  bias means for applying a D.C. bias to each of said second ends of said three conductors, and
  a plurality of current modulation means each responsive to a respective one of said RED, GREEN, and BLUE video signals of said second set from said signal splitting means, and each coupled to a said first end of a respective one of said conductors and powered by said bias means through said conductor, for modulating current flow through said conductors; and
 a second signal conditioning circuit coupled to said second end of said three conductors and couplable to an input of said analog monochrome monitor, said second signal conditioning circuit comprising:
  at least three current amplification means, one of each coupled to one each of said second end of said conductors, for providing amplified RED, GREEN, and BLUE video signal outputs, and
  color-to-monochrome conversion means responsive to each said RED, GREEN, and BLUE signals outputs of said current amplification means, for converting said RED, GREEN, and BLUE signal outputs to a monochrome video signal wherein said RED, GREEN, and BLUE signal outputs, and mixtures thereof, are displayable as a composite of discrete shades of gray on said monochrome monitor.

2. A communication slink as set forth in claim 1 wherein each said signal splitting means comprises a first PNP transistor having a collector coupled to a reference potential and an emitter coupled to a second current source and to a color monitor located proximate a computer, and a base coupled to a one of said output terminals of a computer, for providing a second modulated current flow from said second current source, with said plurality of first current modulation means each comprising a second PNP transistor having a collector coupled to said reference potential, an emitter coupled to a said conductor of said cable, and a base coupled to a said one of said output terminals of a computer, thereby providing said first modulated current flow of said RED, GREEN, and BLUE video signals of said first set to a color monitor located proximate a computer, and modulating said second current flow in said three conductors of said cable responsive to said RED, GREEN, and BLUE video signals of said second set.

3. A communications link as set forth in claim 1 wherein said color-to-monochrome conversion means comprises a plurality of differing resistances, one of each responsive to one said current amplification means and said plurality of differing resistances coupled to a common summing junction, wherein said resistances provide selected, relatively differing voltage level effects, and RED. GREEN, and BLUE signal outputs discretely appearing across said resistances are summed to provide a resultant voltage signal displayable on said monochrome monitor.

4. A communications link as set forth in claim 3 wherein said resistances includes a 27 ohm resistor for reducing a voltage level of a BLUE video signal, a 20 ohm resistor for reducing a voltage level of a RED video signal, and a 7.5 ohm resistor for reducing a voltage level of a GREEN video signal.

5. A communications link as set forth in claim 1 wherein vertical sync signals from said computer are coupled to said color monitor and said monochrome monitor from a common vertical sync terminal of said computer.

6. A communications link as set forth in claim 1 wherein horizontal sync signals from a horizontal sync terminal of a computer are coupled to a buffer amplifier, with an output of said buffer amplifier being coupled to a color monitor located proximate a computer, and said horizontal sync signals from said horizontal sync terminal being coupled to horizontal sync signal modulation means, for modulating a current flow responsive to said horizontal sync signals and applying a horizontal sync signal to a fourth conductor of said cable.

7. A communications link for coupling analog RED, GREEN, and BLUE video signals of a computer to an analog color monitor and to an analog monochrome monitor, one of the monitors located up to approximately 300 feet distant from the computer, comprising:

signal splitting means for receiving at least said RED, GREEN, and BLUE video signals and providing two discrete sets of said video signals, a first set of RED, GREEN, and BLUE video signals and a second set of RED, GREEN, and BLUE video signals;

first signal conditioning means for receiving one set of said first set of video signals comprising:

a cable up to 300 feet in length and having at least first, second, and third discrete, insulated, closely adjacent conductors and an outer shield, said conductors each having a first end at one end and a second end at an opposite end, bias means for applying a D.C. bias to each said second end of said first, second, and third conductors, and a plurality of first signal translation means, each being coupled to said first end of each said first, second, and third conductors and each having an input responsive to said first set of RED, GREEN, and BLUE video signals, for applying current amplified replicas thereof through said first end of said first, second, and third conductors, and each of said first signal translation means being powered from said second end through, respectively, said first, second, and third conductors by said bias means wherein current flow through each said conductor is modulated;

a plurality of second signal translation means, one of each coupled to one of said second ends of said first, second, and third conductors, and one of each said second signal translation means responsive to respective said first current amplified replicas of said RED, GREEN, and BLUE video signals appearing at said second end, for providing as outputs a first set of RED, GREEN, and BLUE monitor signals, a plurality of third signal translation means responsive to said second set of video signals for providing second current amplified replicas of said second set of RED, GREEN, and BLUE video signals, and providing as an output a second set of red, green, and blue monitor signals; and color-to-monochrome conversion means responsive to said first set of monitor signals or said second set of monitor signals, for converting said RED, GREEN, and BLUE video signals to a monochrome video signal wherein each discrete said RED, GREEN, and BLUE monitor signal, and mixtures thereof, is displayable as a discrete shade of gray on said monochrome monitor.

8. A communications link as set forth in claim 7 wherein said color-to-monochrome conversion means comprises a plurality of different resistances, one of each coupled to one of each said RED, GREEN, and BLUE monitor signals, wherein a resistance coupled to a RED monitor signal is approximately 20 ohms, and reduces a level of the RED monitor signal to approximately 78% of a level provided by a computer, and a resistance coupled to a GREEN monitor signal is approximately 7.5 ohms, and reduces a level of the GREEN monitor signal to approximately 91% of a level provided by a computer, and a resistance coupled to a BLUE monitor signal is approximately 27 ohms, and reduces a level of the BLUE monitor signal to approximately 73% of a level provided by a computer, whereby an optimum shade of gray for each color is produced.

* * * * *